(12) United States Patent
Ishikawa

(10) Patent No.: US 8,595,256 B2
(45) Date of Patent: Nov. 26, 2013

(54) POLICY GENERATION AND CONVERSION SYSTEM, POLICY DISTRIBUTION SYSTEM, AND METHOD AND PROGRAM THEREFOR

(75) Inventor: Takayuki Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 23 days.

(21) Appl. No.: 13/255,149

(22) PCT Filed: Mar. 17, 2010

(86) PCT No.: PCT/JP2010/054525
§ 371 (c)(1),
(2), (4) Date: Sep. 7, 2011

(87) PCT Pub. No.: WO2010/107056
PCT Pub. Date: Sep. 23, 2010

(65) Prior Publication Data
US 2012/0030243 A1 Feb. 2, 2012

(30) Foreign Application Priority Data
Mar. 18, 2009 (JP) .................................. 2009-066016

(51) Int. Cl.
*G06F 7/00* (2006.01)
*G06F 17/30* (2006.01)

(52) U.S. Cl.
USPC ......................................... 707/783; 707/785

(58) Field of Classification Search
USPC ................................................ 707/785, 783
See application file for complete search history.

(56) References Cited

U.S. PATENT DOCUMENTS 8,024,356 B2 * 9/2011 Vienneau et al. ............. 707/781

| | | | |
|---|---|---|---|
| 8,095,557 B2 * | 1/2012 | Ahmed et al. | 707/785 |
| 2008/0126287 A1 | 5/2008 | Cox et al. | |
| 2008/0313712 A1 | 12/2008 | Ellison et al. | |
| 2009/0178102 A1 * | 7/2009 | Alghathbar et al. | 726/1 |
| 2010/0199346 A1 * | 8/2010 | Ling et al. | 726/12 |

FOREIGN PATENT DOCUMENTS

| JP | 2004303243 A | 10/2004 |
|---|---|---|
| JP | 2005182478 A | 7/2005 |
| JP | 2005332049 A | 12/2005 |

(Continued)

OTHER PUBLICATIONS

International Search Report for PCT/JP2010/054525 mailed Apr. 20, 2010.

*Primary Examiner* — Thanh-Ha Dang
*Assistant Examiner* — Merilyn Nguyen

(57) ABSTRACT

To eliminate restrictions on the order of writing in an access control list. A permission rule and a prohibition rule are stored in advance. A rule is read out from an access control list accepted, and a determination is made as to whether the readout rule is contained in the permission and prohibition rules stored in advance. When the readout rule is not contained and when the readout rule is a permission rule, the readout rule is stored in the temporary storage unit. When the readout rule is not contained and when the readout rule is a prohibition rule, a determination is made as to whether the prohibition rule conflicts with the permission rule stored in the temporary storage unit. When the prohibition rule does not conflict, the prohibition rule is stored in the temporary storage unit. When the prohibition rule conflicts, the prohibition rule is converted to a prohibition rule by removing access target resources written in the permission rule from access target resources written in the prohibition rule on the basis of resource information, and the prohibition rule is stored.

18 Claims, 12 Drawing Sheets

(56) References Cited

FOREIGN PATENT DOCUMENTS

| | | | |
|---|---|---|---|
| JP | 2006344057 A | 12/2006 |
| JP | 2007087232 A | 4/2007 |
| JP | 2007316952 A | 12/2007 |
| JP | 2008234263 A | 10/2008 |

* cited by examiner

FIG.7

```
yamada:/var/samba/pub/**:read+,write+,execute-
yamada:/var/samba/keiri/**:read+,write+,execute-
yamada:/var/samba/**:read-,write-,execute-
```

FIG.9

```
yamada:/var/samba/pub/**:read+,write+,execute-
yamada:/var/samba/keiri/**:read+,write+,execute-
yamada:/var/samba/soumu/**:read-,write-,execute-
yamada:/var/samba/*:read-,write-,execute-
```

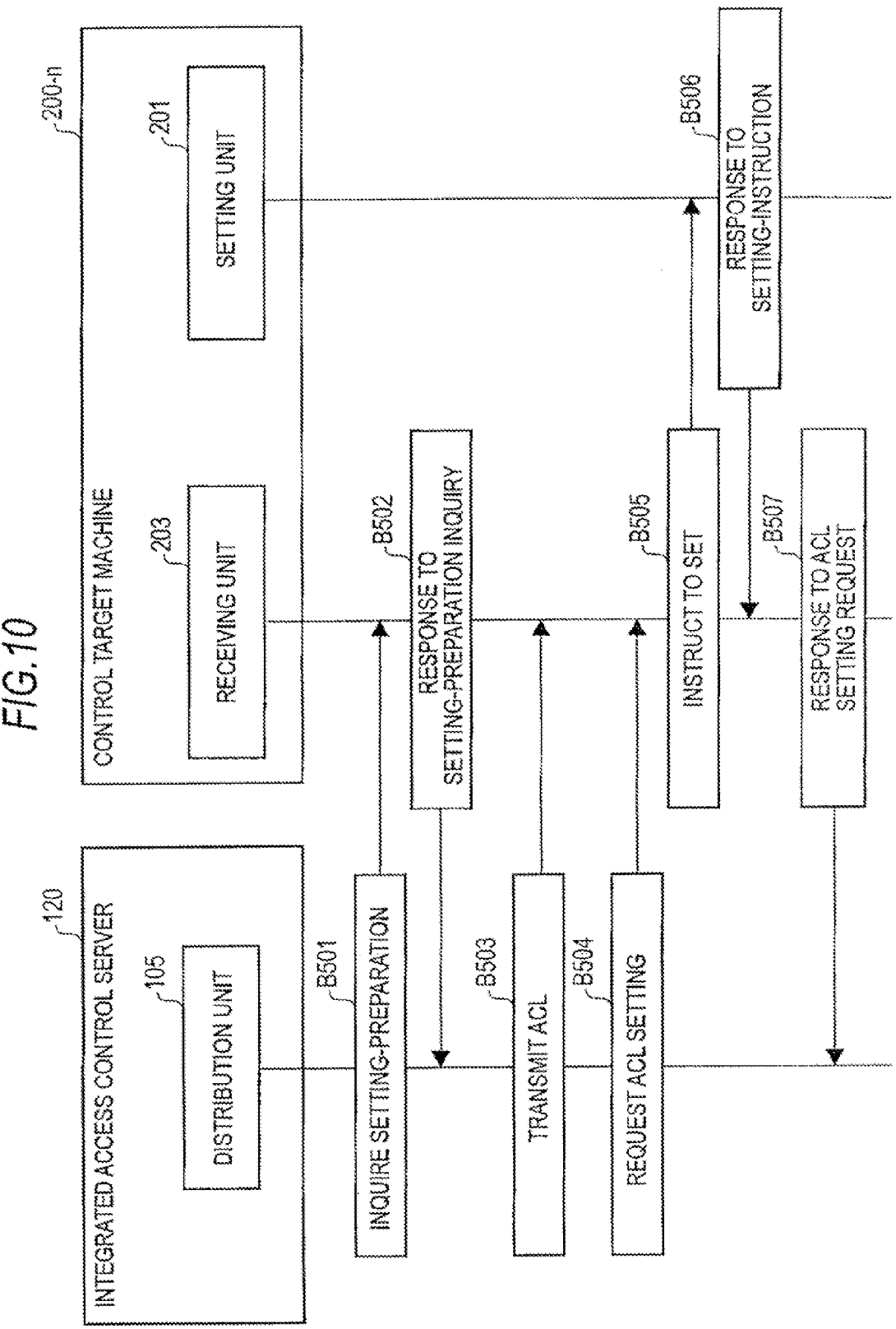

FIG.11

```
<env:Envelope
  xmlns:env="http://www.w3.org/2003/05/soap-envelope"
  xmlns:wsa="http://schemas.xmlsoap.org/ws/2004/08/addressing"
  xmlns:wse="http://schemas.xmlsoap.org/ws/2004/08/eventing"
  xmlns:wsen="http://schemas.xmlsoap.org/ws/2004/09/enumeration"
  xmlns:wsman="http://schemas.dmtf.org/wbem/wsman/1/wsman.xsd"
  xmlns:wsmeta="http://schemas.dmtf.org/wbem/wsman/1/wsman/version1.0.0.a/default-addressing-model.xsd"
  xmlns:wxf="http://schemas.xmlsoap.org/ws/2004/09/transfer"
  xmlns:xs="http://www.w3.org/2001/XMLSchema">
<env:Header>
<wsa:To env:mustUnderstand="true">Target_Address</wsa:To>
<wsa:ReplyTo>
<wsa:Address env:mustUnderstand="true">
  http://schemas.xmlsoap.org/ws/2004/08/addressing/role/anonymous
</wsa:Address>
<wsa:Action env:mustUnderstand="true">
  http://schemas.xmlsoap.org/ws/2004/09/transfer/Get
</wsa:Action>
<wsman:ResourceURI>ResourceURI</wsman:ResourceURI>
<wsa:MessageID env:mustUnderstand="true">Message_Id</wsa:MessageID>
<wsman:SelectorSet>
<wsman:Selector Name="PolicyID">Policy_Id</wsman:Selector>
</wsman:SelectorSet>
</env:Header>
<env:Body/>
</env:Envelope>
```

FIG.12

```
<env:Envelope
    xmlns:env="http://www.w3.org/2003/05/soap-envelope"
    xmlns:wse="http://schemas.xmlsoap.org/ws/2004/08/addressing"
    xmlns:wse="http://schemas.xmlsoap.org/ws/2004/08/eventing"
    xmlns:wsen="http://schemas.xmlsoap.org/ws/2004/09/enumeration"
    xmlns:wsman="http://schemas.dmtf.org/wbem/wsman/1/wsman.xsd"
    xmlns:wsmeta="http://schemas.dmtf.org/wbem/wsman/1/wsman.xsd"
    xmlns:wxf="http://schemas.xmlsoap.org/ws/2004/09/transfer"
    xmlns:xs="http://www.w3.org/2001/XMLSchema">
<env:Header>
<wsa:To env:mustUnderstand="true">Target_Address</wsa:To>
<wsa:ReplyTo>
<wsa:Address env:mustUnderstand="true">
    http://schemas.xmlsoap.org/ws/2004/08/addressing/role/anonymous
</wsa:Address>
</wsa:ReplyTo>
<wsa:RelatesTo>Authentication_Id</wsa:RelatesTo>
<wsa:Action env:mustUnderstand="true">
    http://schemas.xmlsoap.org/ws/2004/09/transfer/Put
</wsa:Action>
<wsman:ResourceURI>ResourceURI</wsman:ResourceURI>
<wsa:MessageID env:mustUnderstand="true">Message_Id</wsa:MessageID>
<wsman:SelectorSet>
<wsman:Selector Name="PolicyID">Policy_Id</wsman:Selector>
</wsman:SelectorSet>
</env:Header>
<env:Body>
<ns:policyInformation>
<ns:id>Policy_Id</ns:id>
<ns:path>PolicyFilePath</ns:path>
</ns:policyInformation>
</env:Body>
</env:Envelope>
```

POLICY GENERATION AND CONVERSION SYSTEM, POLICY DISTRIBUTION SYSTEM, AND METHOD AND PROGRAM THEREFOR

TECHNICAL FIELD

The present invention relates to a system of generating and converting a policy constituted by an access control list (referred to as "ACL," hereinafter and in the drawings when necessary), and a distribution system of the policy.

BACKGROUND ART

As for the distribution of a policy expressed as an access control list, many examples have been observed in which for a plurality of control target machines, one integrated access control server carries out access control.

Under such a situation, it is hoped that the maintainability at a time when an access control list is corrected after a policy is changed is improved.

In this case, an access control list is generally formed as a combination of access control rules, each of which includes an access actor user (a user as access actor), an access target resource, and an access right of permission or prohibition as a set.

In that regard, there is the invention disclosed in PTL 1 as a method of updating a policy associated with a change of a system configuration. Moreover, there is the invention disclosed in PTL 2 as a method of distributing again to a required target device after a policy is changed. According to the above inventions, an entire access control list including a policy that has been so altered as to contain an unchanged portion is restructured, and the entire control list restructured is distributed again. By taking such a measure, it becomes easier to correct a policy rule at a time when a system configuration is changed.

CITATION LIST

Patent Literature

{PTL 1} JP-A-2007-087232
{PTL 2} JP-A-2007-316952

SUMMARY OF INVENTION

Technical Problem

However, there are the following problems with each of the above inventions.

The first problem is that the cost of correcting an access control list at a time when an access control policy is changed is enormous.

The reason is that in an access control list, the order that access control rules are written has a meaning, and the interpretation of an access control mechanism varies according to the order of writing. Therefore, it is necessary to take into account not only an access control list changed by adding or deleting an access control rule but also the order of writing thereof.

In that regard, when the order of writing is not taken into account, there is no guarantee that an access control list will be interpreted as intended by a person who has changed the access control list even if the contents of each access control rule are the same. The above point will be described below with a specific example.

(Rule 1) An given user must not read and write a file under an /etc directory.

In order to give user "Yamada" a special privilege for an access control list to which the above rule is written, suppose that the following rule 2 is added after the rule 1.

(Rule 2) A user "Yamada" is allowed to change an /etc/passwd file.

In this case, an access control mechanism carries out control in a way that runs counter to the intention of a person who has changed the access control list that user "Yamada" is prohibited from changing /etc/passwd.

The reason is that the rule 1 is first satisfied for the access request because the access control mechanism has an interpretation characteristic of prioritizing a condition which is satisfied firstly. In order to correctly reflect the above special privilege, the rule 2 needs to be written at least before the rule 1.

In that manner, due to the characteristic by which the behavior of the access control mechanism varies according to the order that access control rules are written, it becomes difficult to appropriately change the access control list, as well as to examine that which user can access which resource under the current access control list or which user cannot.

The problem with the above changing of the access control list becomes more serious as the number of rules in the access control list increases, and has been one factor for defective access-right settings.

The second problem is that it is necessary to create an access control list for each access control mechanism.

The reason is that when access control is carried out by a plurality of various access control mechanisms, it is necessary to create an access control policy of the same access-control contents for each of the following access control mechanisms having different characteristics: an access control mechanism having a characteristic of processing access control rules in the order that the access control rules are written from top in an access control list; and an access control mechanism having a characteristic of processing in an arbitrary order. That is, now that there are a plurality of access-control target machines having various characteristics, it is necessary to create or correct an access control list for each characteristic of the access control mechanisms when a new access control policy is designed or when an access control policy is changed for the first time.

Accordingly, the object of the present invention is to provide a policy generation and conversion system, a policy distribution system, and a method and program thereof, which can reduce the cost of correcting an access control list after an access control policy is altered without any restrictions on the order that access control rules are written.

Solution to Problem

According to the first aspect of the present invention, an access list conversion device that is connected to a resource database in which the state of a resource as an access target is recorded and updates an access control rule using an access control list, which is a collection of rules used to control access to the resource, includes: a temporary storage unit that stores in advance a "permission rule" providing that an actor, which is a target of the access control, can access the resource and a "prohibition rule" providing that the actor cannot access the resource; an already-existing rule judgment (determining) unit that reads out a rule from the access control list accepted and judges whether the readout rule is contained in the permission and prohibition rules stored in advance in the temporary storage unit; a first rule judgment (determining) unit that records the readout rule in the temporary storage unit when the judgment result shows that the readout rule is not contained and when the readout rule is a permission rule; a second rule judgment unit that makes, when the judgment result shows that the readout rule is not contained and when the readout rule is a prohibition rule, a determination as to whether the prohibition rule conflicts with the permission rule stored in the temporary storage unit, and stores, when the prohibition rule does not conflict, the prohibition rule in the temporary storage unit; and a resource expansion unit that converts, when the result of judgment by the second rule judgment unit shows that the prohibition rule conflicts, the prohibition rule to a prohibition rule by removing access target resources written in the permission rule from access target resources written in the prohibition rule on the basis of resource information of the resource database and stores the prohibition rule in the temporary storage unit.

According to the second aspect of the present invention, an access list conversion device that is connected to a resource database in which the state of a resource as an access target is recorded and updates an access control rule using an access control list, which is a collection of rules used to control access to the resource, includes: a temporary storage unit that stores in advance a "permission rule" providing that an actor, which is a target of the access control, can access the resource and a "prohibition rule" providing that the actor cannot access the resource; an already-existing rule judgment unit that reads out a rule from the access control list accepted and judges whether the readout rule is contained in the permission and prohibition rules stored in advance in the temporary storage unit; a first rule judgment unit that records the readout rule in the temporary storage unit when the judgment result shows that the readout rule is not contained and when the readout rule is a prohibition rule; a second rule judgment unit that makes, when the judgment result shows that the readout rule is not contained and when the readout rule is a permission rule, a determination as to whether the permission rule conflicts with the prohibition rule stored in the temporary storage unit, and stores, when the permission rule does not conflict, the permission rule in the temporary storage unit; and a resource expansion unit that converts, when the result of judgment by the second rule judgment unit shows that the permission rule conflicts, the permission rule to a permission rule by removing access target resources written in the prohibition rule from access target resources written in the permission rule on the basis of resource information of the resource database and stores the permission rule in the temporary storage unit.

According to the third aspect of the present invention, an access list conversion method that updates an access control rule using an access control list, which is a collection of rules used to control access to a resource, in an access control list conversion device connected to a resource database in which the state of the resource as an access target is recorded includes: a step of preparing a temporary storage device that stores in advance a "permission rule" providing that an actor, which is a target of the access control, can access the resource and a "prohibition rule" providing that the actor cannot access the resource; an already-existing rule judgment step of reading out a rule from the access control list accepted and judging whether the readout rule is contained in the permission and prohibition rules stored in advance in the temporary storage device; a first rule judgment step of recording the readout rule in the temporary storage device when the judgment result shows that the readout rule is not contained and when the readout rule is a permission rule; a second rule judgment step of making, when the judgment result shows that the readout rule is not contained and when the readout rule is a prohibition rule, a determination as to whether the prohibition rule conflicts with the permission rule stored in the temporary storage unit, and storing, when the prohibition rule does not conflict, the prohibition rule in the temporary storage unit; and a resource expansion step of converting, when the result of judgment by the second rule judgment step shows that the prohibition rule conflicts, the prohibition rule to a prohibition rule by removing access target resources written in the permission rule from access target resources written in the prohibition rule on the basis of resource information of the resource database and storing the prohibition rule in the temporary storage device.

According to the fourth aspect of the present invention, an access list conversion method that updates an access control rule using an access control list, which is a collection of rules used to control access to a resource, in an access control list conversion device connected to a resource database in which the state of the resource as an access target is recorded includes: a step of preparing a temporary storage device that stores in advance a "permission rule" providing that an actor, which is a target of the access control, can access the resource and a "prohibition rule" providing that the actor cannot access the resource; an already-existing rule judgment step of reading out a rule from the access control list accepted and judging whether the readout rule is contained in the permission and prohibition rules stored in advance in the temporary storage device; a first rule judgment step of recording the readout rule in the temporary storage device when the judgment result shows that the readout rule is not contained and when the readout rule is a prohibition rule; a second rule judgment step of making, when the judgment result shows that the readout rule is not contained and when the readout rule is a permission rule, a determination as to whether the permission rule conflicts with the prohibition rule stored in the temporary storage unit, and storing, when the permission rule does not conflict, the permission rule in the temporary storage unit; and a resource expansion step of converting, when the result of judgment by the second rule judgment step shows that the permission rule conflicts, the permission rule to a permission rule by removing access target resources written in the prohibition rule from access target resources written in the permission rule on the basis of resource information of the resource database and storing the permission rule in the temporary storage device.

According to the fifth aspect of the present invention, an access list conversion program, installed in an access list conversion device that is connected to a resource database in which the state of a resource as an access target is recorded and updates an access control rule using an access control list which is a collection of rules used to control access to the resource, causes a computer to function as the access list conversion device including: a temporary storage unit that stores in advance a "permission rule" providing that an actor, which is a target of the access control, can access the resource and a "prohibition rule" providing that the actor cannot access the resource; an already-existing rule judgment unit that reads out a rule from the access control list accepted and judges whether the readout rule is contained in the permission and prohibition rules stored in advance in the temporary storage unit; a first rule judgment unit that records the readout rule in the temporary storage unit when the judgment result shows that the readout rule is not contained and when the readout rule is a permission rule; a second rule judgment unit that makes, when the judgment result shows that the readout rule is not contained and when the readout rule is a prohibition rule, a determination as to whether the prohibition rule conflicts with the permission rule stored in the temporary storage unit, and stores, when the prohibition rule does not conflict, the prohibition rule in the temporary storage unit; and a resource expansion unit that converts, when the result of judgment by the second rule judgment unit shows that the prohibition rule conflicts, the prohibition rule to a prohibition rule by removing access target resources written in the permission rule from access target resources written in the prohibition rule on the basis of resource information of the resource database and stores the prohibition rule in the temporary storage unit.

According to the sixth aspect of the present invention, an access list conversion program, installed in an access list conversion device that is connected to a resource database in which the state of a resource as an access target is recorded and updates an access control rule using an access control list which is a collection of rules used to control access to the resource, causes a computer to function as the access list conversion device including: a temporary storage unit that stores in advance "permission rule" providing that an actor, which is a target of the access control, can access the resource and a "prohibition rule" providing that the actor cannot access the resource; an already-existing rule judgment unit that reads out a rule from the access control list accepted and judges whether the readout rule is contained in the permission and prohibition rules stored in advance in the temporary storage unit; a first rule judgment unit that records the readout rule in the temporary storage unit when the judgment result shows that the readout rule is not contained and when the readout rule is a prohibition rule; a second rule judgment unit that makes, when the judgment result shows that the readout rule is not contained and when the readout rule is a permission rule, a determination as to whether the permission rule conflicts with the prohibition rule stored in the temporary storage unit, and stores, when the permission rule does not conflict, the permission rule in the temporary storage unit; and a resource expansion unit that converts, when the result of judgment by the second rule judgment unit shows that the permission rule conflicts, the permission rule to a permission rule by removing access target resources written in the prohibition rule from access target resources written in the permission rule on the basis of resource information of the resource database and stores the permission rule in the temporary storage unit.

Advantageous Effects of Invention

According to the present invention, it is possible to generate an access control list that has no restrictions on the order that access control rules are written. Therefore, it is possible to reduce the cost of correcting an access control list after an access control policy is changed.

BRIEF DESCRIPTION OF DRAWINGS

FIG. 7 is a diagram showing a typical top-priority access control list.

FIG. 9 is a diagram showing an access control list having no restrictions on the order that altered access control rules are written.

FIG. 10 is a sequence chart showing a distribution and setting protocol for policy.

FIG. 11 is a diagram showing a policy setting preparation inquiry message in SOAP.

FIG. 12 is a diagram showing a policy setting instruction message in SOAP.

DESCRIPTION OF EMBODIMENTS

The following describes in detail the best mode for carrying out the invention with reference to the accompanying drawings.

An embodiment of the present invention is, in brief, a process of converting, for an input access control list that is affiliated with an access control rule, the access control list in such a way that two arbitrary rules in the list do not conflict with each other.

Figure 1:
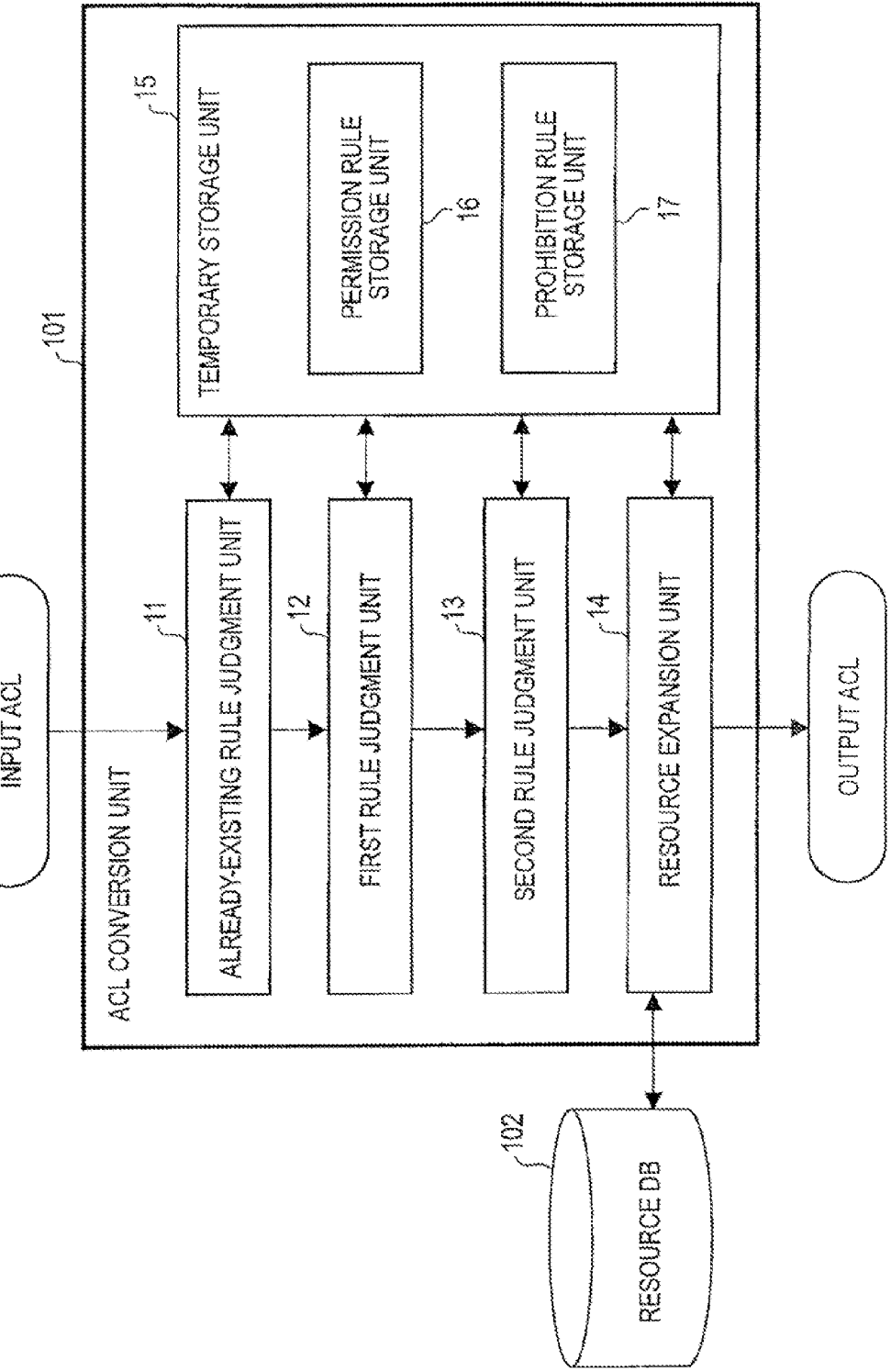
FIG. 1 is a block diagram showing an example of the configuration of an access control list generation and conversion system according to a first embodiment of the present invention.

With reference to FIG. 1, an access control list generation and conversion system of a first embodiment of the present invention includes an ACL conversion unit 101 and a resource DB 102.

The resource DB 102 stores all the most recent information about a resource that is to be subjected to access control by an access control list (ACL).

Incidentally, in the descriptions of the present specification, drawings and claims, an access control rule has a combination of the following three: an "access actor user, access target resource, and access right of permission or prohibition."

The access target resource is expressed as a set or an element. The following are set notations: "directly under" is represented by "*", and "everything under" by "**".

The ACL conversion unit 101 includes an already-existing rule judgment (determining) unit 11, a first rule judgment unit 12, a second rule judgment unit 13, a resource expansion unit 14, and a temporary storage unit 15.

Moreover, the temporary storage unit 15 includes a permission rule storage unit 16 and a prohibition rule storage unit 17:

The permission rule storage unit 16 has a function of storing a "permission rule," which is a rule to allow access to an access target resource of an access actor user.

Meanwhile, the prohibition rule storage unit 17 has a function of storing a "prohibition rule," which is a rule to prohibit access to an access target resource of an access actor user.

The already-existing rule judgment unit 11 reads, when a new access control list is accepted by the ACL conversion unit 101, one new access control rule at a time in the order that access control rules are written in the access control list (the present rule that have been read is referred to as "the new rule," hereinafter). Moreover, the already-existing rule judgment unit 11 reads the access control rules and, at the same time, checks the temporary storage unit 15; and judges whether the new access control rule that have been read this time is included in the access control contents of a rule that has been already existed in an upper portion by the new rule. When the judgment result is that the new rule is included in the access control contents of the already-existing rule, the already-existing rule judgment unit 11 repeats an operation for the next access control rule as a target. When the new rule is not included in the access control contents of the already-existing rule, the already-existing rule judgment unit 11 hands the new rule over to the first rule judgment unit 12.

When the new rule is not included in the access control contents of the already-existing rule, the first rule judgment unit 12 judges whether the new rule is a permission or prohibition rule. When the new rule is a permission rule, the new rule is stored in the permission rule storage unit 16. In this case, the process returns to an operation of the already-existing rule judgment unit 11. When the new rule is not a permission rule but a prohibition rule, the first rule judgment unit 12 hands the new rule over to the second rule judgment unit 13.

When the new rule is a prohibition rule, the second rule judgment unit 13 judges whether, in a permission rule stored in the permission rule storage unit 16, an access actor user is the same as the new rule, and whether an access target resource is included in an access target resource of the new rule. That is, the second rule judgment unit 13 judges whether the new rule conflicts with a permission rule stored in the permission rule storage unit 16. When the new rule does not conflict with a permission rule stored in the permission rule storage unit 16, the rule is stored in the prohibition rule storage unit 17. In this case, the process returns to an operation of the already-existing rule judgment unit 11. When the new rule conflicts with a permission rule stored in the permission rule storage unit 16, the second rule judgment unit 13 hands the new rule over to the resource expansion unit 14.

The resource expansion unit 14 carries out extraction/expansion using the resource DB 102 so that an access target resource of the new rule that conflicts with a rule stored in the permission rule storage unit 16 turns out to be a group of resources that does not include an access target resource of the rule stored in the permission rule storage unit 16. Thus, it is possible to rewrite an access control rule in such a way that access-target resources do not overlap between rules. Then, the new rule that has been subjected to the extraction/expansion is stored in the prohibition rule storage unit 17. When the new rule is not the last rule in the access control list, the process returns to an operation of the already-existing rule judgment unit 11. When the new rule is the last rule, the operation comes to an end.

Figure 2:
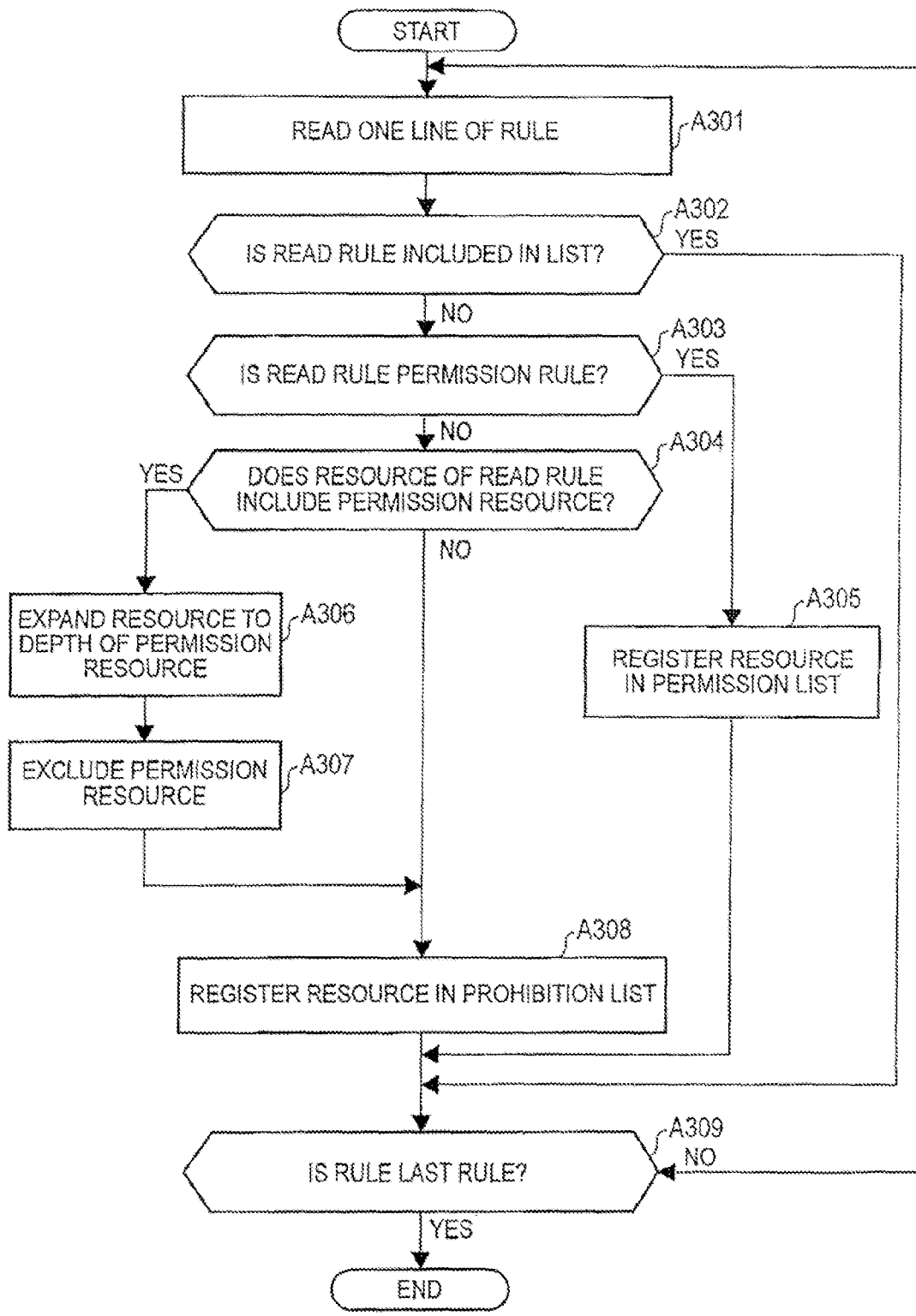
FIG. 2 is a flowchart showing an operation of an access control list generation and conversion algorithm according to the first embodiment of the present invention.

The following describes in detail an operation of the present embodiment with reference to a flowchart of FIG. 2 as well as FIG. 1.

When an access control list is input according to the present embodiment, the access control list is supplied to the already-existing rule judgment unit 11. The already-existing rule judgment unit 11 reads one line of access control rule at a time in the order that access control rules are written in the accepted access control list (Step A301 of FIG. 2).

Then, the already-existing rule judgment unit 11 checks the already-existing permission and prohibition rules stored in the temporary storage unit 15; and judges whether the new rule that has been read is included in the permission and prohibition rules that have been ranked above the new rule (Step A302 of FIG. 2).

In this case, the fact that a rule is included indicates the situation in which the access actor and access right (permission or prohibition) of a given rule are all the same as those of the included rule, and an access target resource of a given rule is a subset of an access target resource of the included rule.

When the judgment result is that the new rule is not included in those stored in the temporary storage unit 15 (NO at step A302 of FIG. 2), the new rule is supplied to the first rule judgment unit 12 (Proceed to Step A303 of FIG. 2).

When the new rule is already included in rules stored in the temporary storage unit 15 (YES at step A302 of FIG. 2), it is unnecessary to add the new rule that has been processed this time over again. Accordingly, a process of confirming whether the new rule that has been read this time is the last in the access control list takes place; when the new rule is the last, the operation comes to an end (YES at step A309 of FIG. 2). When the new rule that has been processed this time is not the last in the access control list, the first rule after the processed rule is recognized as a target, and the process of step A301 and the subsequent processes are performed again (NO at step A309 of FIG. 2).

Subsequently, the first rule judgment unit 12 judges whether the new rule is a permission rule (Step A303 of FIG. 2).

When the new rule is not a permission rule but a prohibition rule (NO at step A303 of FIG. 2), the new rule is supplied to the second rule judgment unit 13 (Proceed to step A304 of FIG. 2).

When the new rule is a permission rule (YES at step A303 of FIG. 2), the new rule is stored in the permission rule storage unit 16 (Step A305 of FIG. 2). After that, when the new rule that has been processed this time is the last in the access control list, the operation comes to an end (YES at step A309 of FIG. 2). When the new rule that has been processed this time is not the last in the access control list, the first rule after the processed rule is recognized as a target, and the process of Step A301 and the subsequent processes are performed again (NO at step A309 of FIG. 2).

The second rule judgment unit 13 judges whether an access actor user written in the new rule is equal to an access actor user of a permission rule stored in the permission rule storage unit 16, and whether an access target resource written in the new rule contains an access target resource written in a permission rule stored in the permission rule storage unit 16 (Step A304 of FIG. 2).

When the judgment result is that the access target resource written in the new rule does not contain the access target resource written in the permission rule (NO at step A304 of FIG. 2), the new rule is stored in the prohibition vile storage unit 17 without change (Step A308). When the access target resource written in the new rule contains the access target resource written in the permission rule (YES at step A304 of FIG. 2), the new rule is supplied to the resource expansion unit 14 (Proceed to step A306 of FIG. 2).

The resource expansion unit 14 expands an access target resource of the new rule to a depth that enables the access target resource written in the new rule to show a group or element of access target resources written in a permission rule stored in the permission rule storage unit 16 containing the new rule (Step A306 of FIG. 2). In this case, the fact that the depths of resources are the same indicates that the hierarchies of expressions (expression hierarchies) of the resources are equal and the resources each are not a subset of each other. The resources of the new rule that has been expanded to the same depth as a resource written in the permission rule are stored in the prohibition rule storage unit 17 except for a resource written in the permission rule (Steps A307 and A8 of FIG. 2).

After that, when the new rule that has been processed this time is the last in the access control list, the operation comes to an end (YES at step A309 of FIG. 2).

When the new rule that has been processed this time is not the last in the access control list, the first rule after the processed rule is recognized as a target, and the process of step A301 and the subsequent processes are performed again (NO at step A309 of FIG. 2).

What is finally output is a group of rules stored in the prohibition rule storage unit 17 as an access control list.

What has been described this time of the present embodiment is a method of converting to an access control list without any restrictions on the order of writing in a so-called black-list format. It is also possible to convert to an access control list without any restrictions on the order of writing in a so-called white-list format, which lists permission rules, by replacing permission and prohibition at each of the above steps. In this case, the black-list format means that an access control condition of a to-be-generated access control list is so set by default as to allow access to a resource that is not to be written. The white-list format means that the access control condition is so set as to prohibit access to a resource that is not to be written.

The following describes in detail a difference distribution system for access control lists according to a second embodiment of the present invention with reference to the accompanying drawings.

According to the present embodiment, access control lists are managed in an integrated manner; an access control list is updated based on an updated policy.

Moreover, to each control target machine, a difference between an access control list that has not yet been updated and the updated access control list is delivered.

Figure 3:
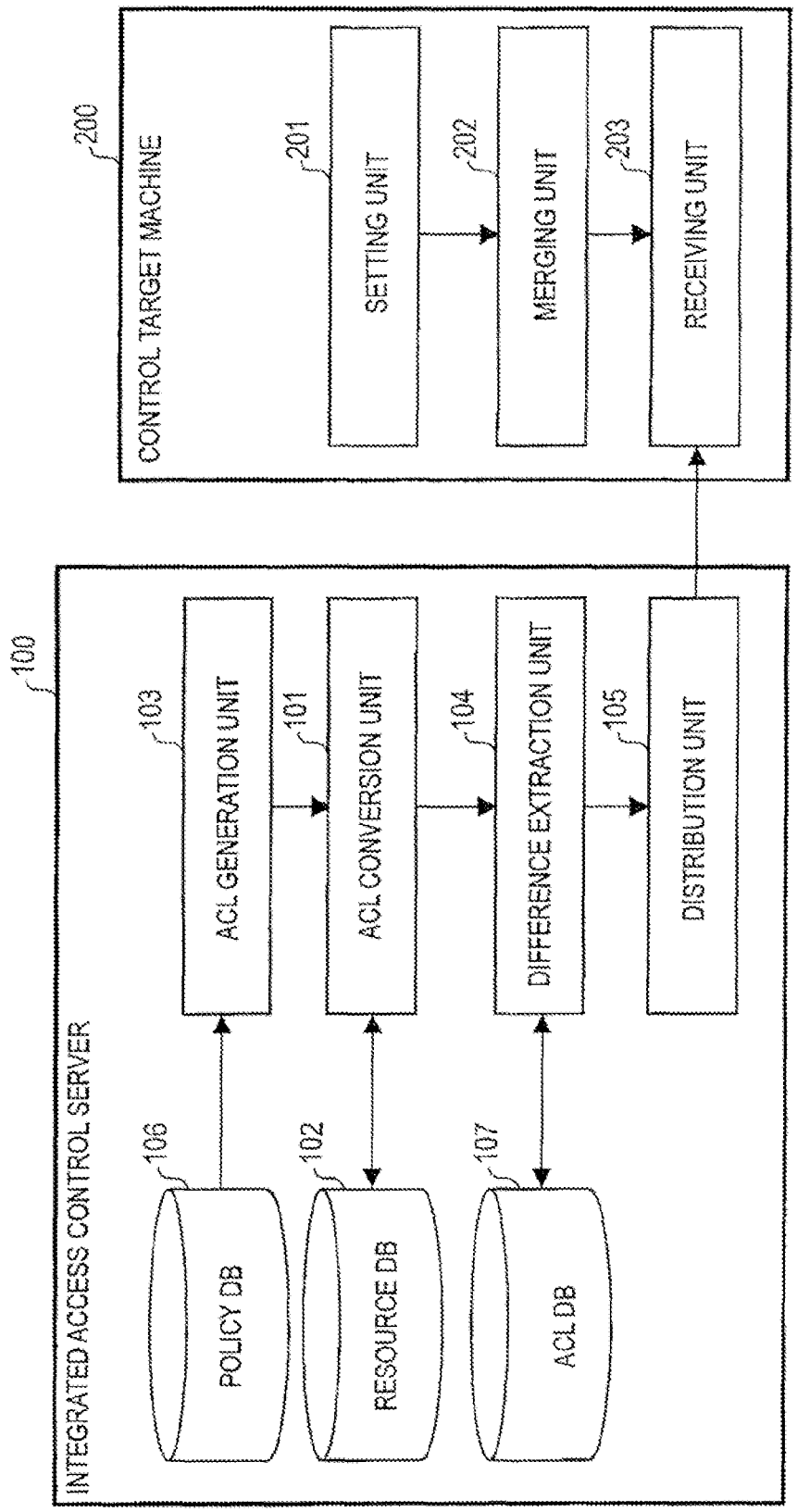
FIG. 3 is a block diagram showing an example of the configuration of a difference distribution system for access control list according to a second embodiment of the present invention.

With reference to FIG. 3, the present embodiment includes an integrated access control server 100 and a control target machine 200.

The integrated access control server 100 includes a policy DB 106, a resource DB 102, an ACLDB 107, an ACL generation unit 101, an ACL conversion unit 103, a difference extraction unit 104, and a distribution unit 105.

What is accumulated in the policy DB 106 is a policy in which information about access control is recorded. What is accumulated in the ACLDB 107 is an access control list that has been generated and delivered in the past.

The control target machine 200 includes a setting unit 201, a merging unit 202, and a receiving unit 203.

In the integrated access control server 100, a policy, which is the updated access control information, is supplied from the policy DB 106 to the ACL generation unit 103. The policy serves as a material of a policy that is to be distributed to the control target machine 200.

Figure 4:
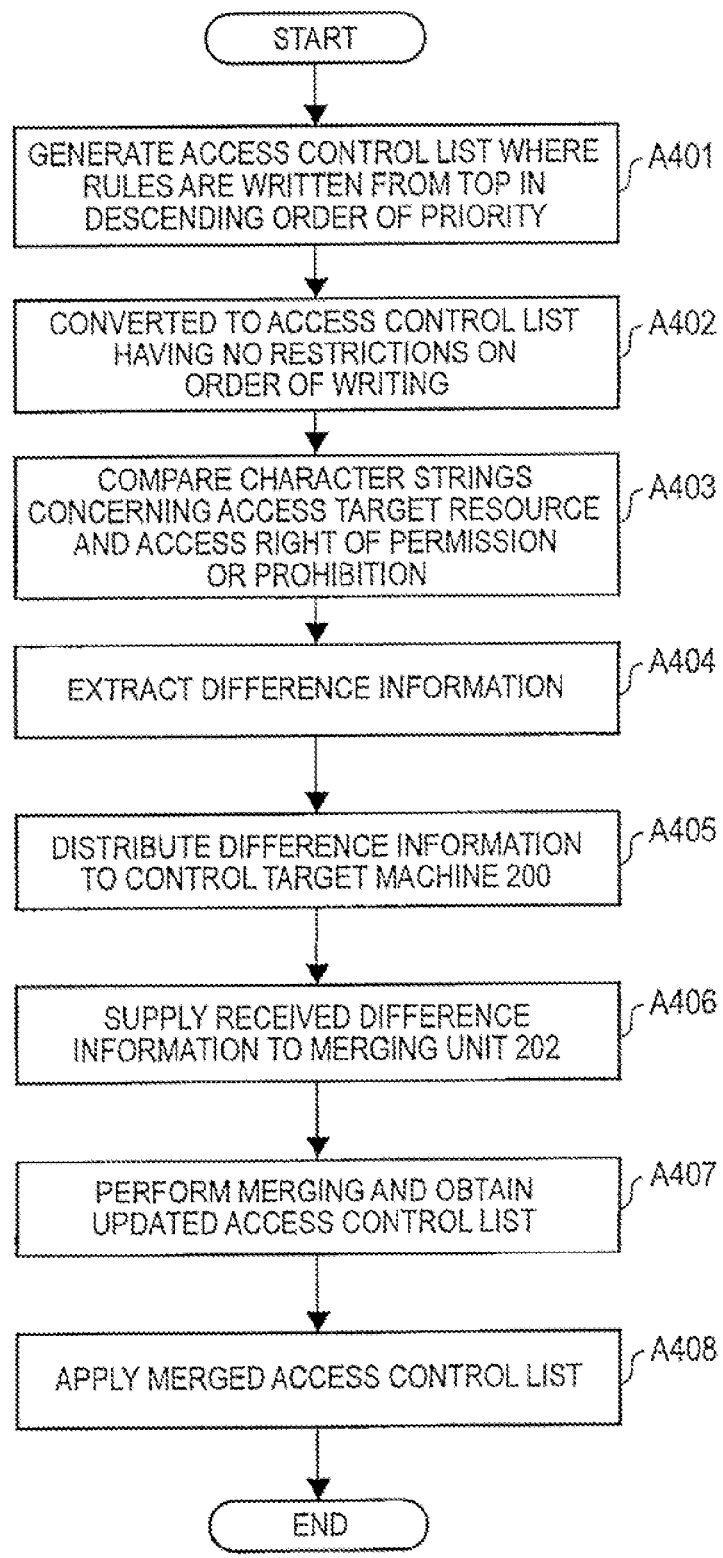
FIG. 4 is a flowchart showing an operation of the difference distribution system for access control list according to the second embodiment of the present invention.

The ACL conversion unit 103 uses the supplied policy to generate an access control list where access control rules, which are expressed by access actor users, access target, resources and access rights of permission or prohibition, are written from top in descending order of priority (Step A401 of FIG. 4). Incidentally, in the access control list, users for whom access control is performed in a policy are written as access actor users, resources for which access control is performed in a policy are written as access target resources, and access rights that are granted to users in a policy are written as access rights of permission or prohibition.

The generated access control list is supplied to the ACL generation unit 101, in which the generated access control list is converted with the use of resource information of the resource DB 102 to an access control list having no restrictions on the order of writing (Step A402 of FIG. 4). A process of generating the access control list having no restrictions on the order of writing by the resource DB102 and the ACL conversion unit 101 is the same as that of the first embodiment shown in FIG. 1.

Then, the difference extraction unit 104 compares character strings, which are about access target resources and access rights of permission or prohibition, one by one of access control rules that contain the same access actor user and are written in an access control list, which is converted by the ACL conversion unit 101 and has no restrictions on the order, and in an access control list, which is the access control list that has been accumulated in the ACLDB 107 and has not yet been updated (Step A403 of FIG. 4). Then, the difference extraction unit 104 extracts the following rule as difference information (Step A404 of FIG. 4): an access control rule that is written in the access control list that has not yet been updated but is not written in a newly-converted access control list, or an access control rule that is not written in the ACL that has not yet been updated but is written in a newly-converted access control list.

The difference information is made up only of a collection of access control rules that have been added or deleted in the newly-converted access control list for the access control list that has not yet been updated. The difference information does not contain writing order information. The extracted difference information is supplied to the distribution unit 105.

Subsequently, the distribution unit 105 distributes the supplied difference information to the control target machine 200 (Step A405 of FIG. 4).

In the control target machine 200, the receiving unit 203 receives the difference information distributed by the distribution unit 105 of the integrated access control server 100, and supplies the received difference information to the merging unit 202 (Step A406 of FIG. 4).

On the basis of the difference information, the merging unit 202 additionally writes an added access control rule to the access control list that is currently applied and has not yet been updated; carries out merging by deleting a deleted access control rule; and obtains an access control list that has been updated. The merged access control list is supplied to the setting unit 201 (Step A407 of FIG. 4).

After that, the setting unit 201 applies the merged access control list to the control target machine (Step A408 of FIG. 4).

According to the present embodiment, only the additional information of access control rules and deletion information are distributed as difference information. Therefore, it is possible to generate an access control list that has been updated. Moreover, the information required for updating does not contain restrictions on the order. Therefore, it is possible to reduce the communication traffic volume between the integrated access control server 100 and the control target machine 200. In addition, it is unnecessary to reconfigure access control lists with the order of writing taken into account. Therefore, it is possible to curb the amount of resources used by the control target machine for updating access control lists.

The following describes in detail a consistency guarantee difference distribution system for access control lists according to a third embodiment of the present invention, with reference to the accompanying drawings.

Figure 5:
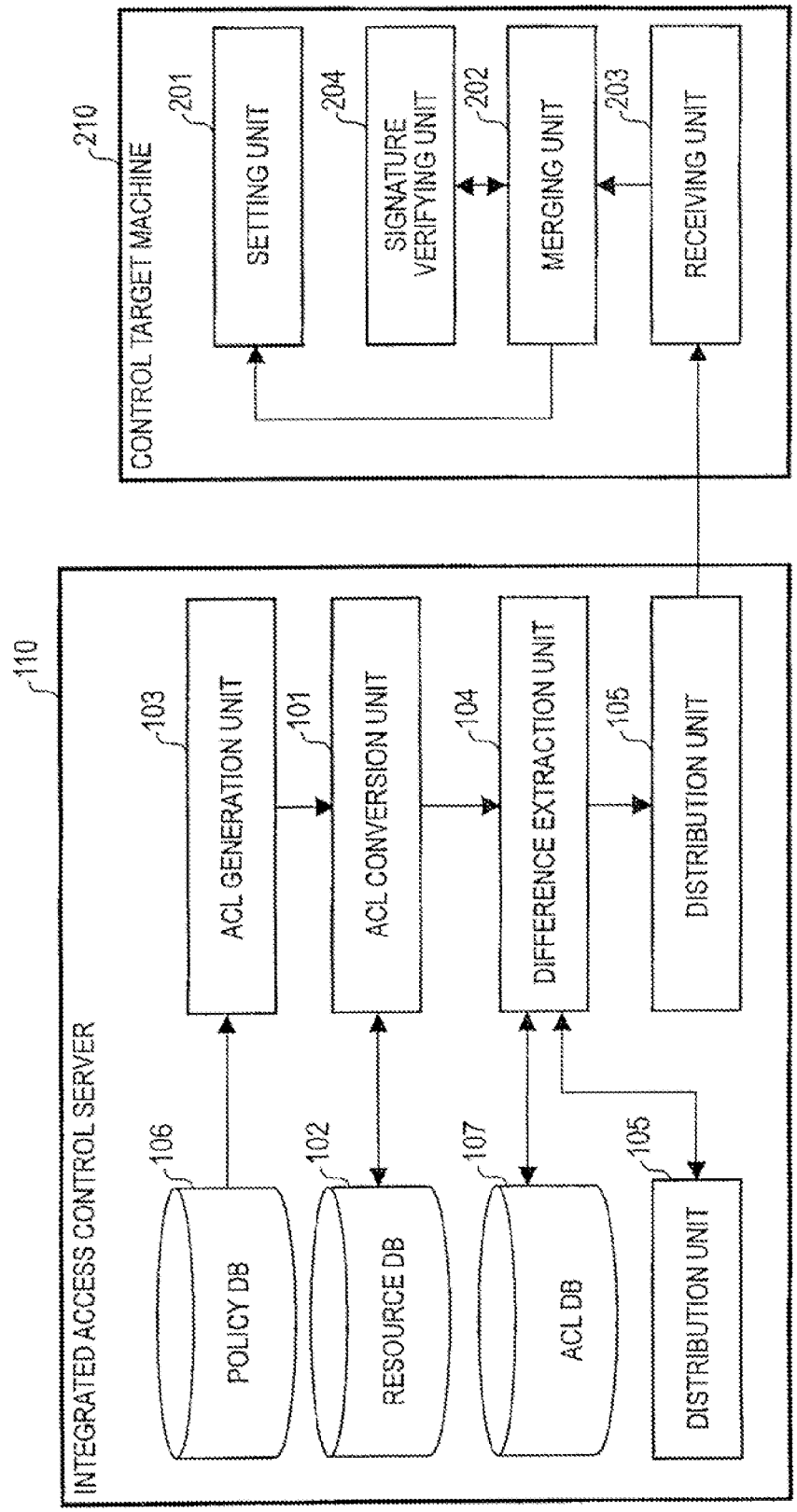
FIG. 5 is a block diagram showing an example of the configuration of a difference distribution consistency guarantee system for access control list according to a third embodiment of the present invention.

According to the present embodiment, what is shown is an example of ensuring consistency in distributing a difference of access control lists. With reference to FIG. 5, the present embodiment includes an integrated access control server 110 and a control target machine 210. When compared with the integrated access control server 100, the integrated access control server 110 is different in that the integrated access control server 110 further includes a signature unit 108. When compared with the control target machine 200, the control target machine 210 is different in that the control target machine 210 further includes a signature verifying unit 204. Other parts of the integrated access control server 110 and control target machine 210, the functions of each database, and the operations are the same as those in the second embodiment.

The following describes different operations of each unit.

The difference information extracted by the difference extraction unit 104 of the integrated access control server 110 is supplied to the signature unit 108. The signature unit 108 adds a digital signature to the supplied difference information by following a predetermined signature scheme, such as a RSA signature scheme, with the use of a secret key that is stored in the integrated access control server 110 and indicates a valid integrated access control server.

The difference information of access control lists, to which the signature has been added, is distributed by the distribution unit 105 to the control target machine 210 in the same way as in the second embodiment.

In the control target machine 210, the signature-added difference information, received by the receiving unit 203, is supplied to the merging unit 202.

The merging unit 202 supplies the signature, which has been added to the supplied difference information, to the signature verifying unit 204. The signature verifying unit 204 examines the validity of the difference information with the use of a public key that is stored in the control target machine and issued by a valid integrated access control server 110.

When the validity of the difference information is assured, the merging unit 202 additionally writes an added access control rule to an access control list that is currently applied and has not yet been updated, and deletes a deleted access control rule. The merged access control list is applied by the setting unit 201 to the control target machine. When the validity of the difference information is not assured, the access control list is not applied.

According to the present embodiment, the advantage is that if the validity of the difference information, which is collection information of access control rules, is assured, the validity of the access control list, which is obtained by merging an access control list that has not yet been updated and the difference information and which has been updated, is assured.

Example

The following describes in detail a more specific example with reference to the accompanying drawings.

According to the present example, access control lists (ACLs) are managed in an integrated manner. An access control list is generated from a policy that has been mapped out. The access control list is distributed and set in each control target machine.

Figure 6:
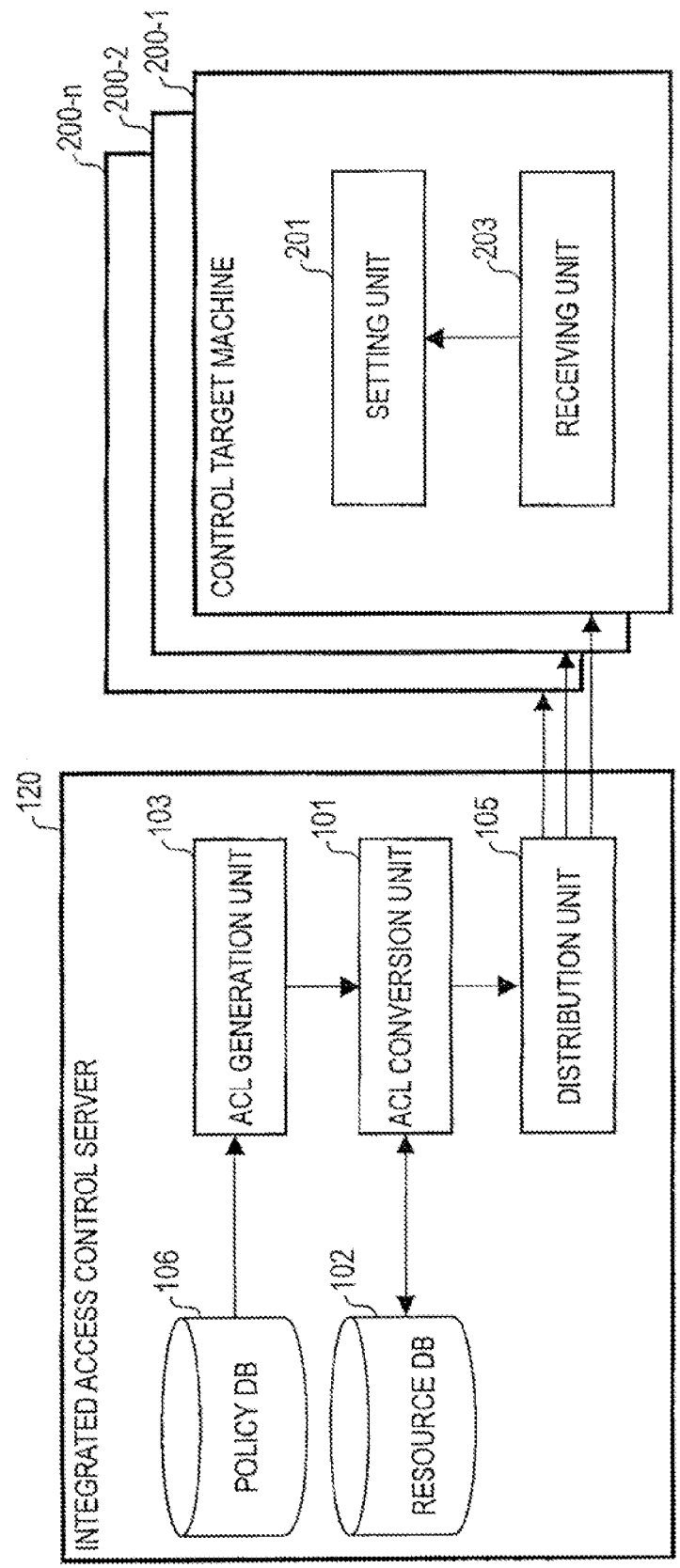
FIG. 6 is a block diagram showing a generation/conversion/distribution system for access control list according to an example of the present invention.

With reference to FIG. 6, in the present example, there are an integrated access control server 120 and a plurality of control target machines 200-1 to 200-n, the number of which is n.

The integrated access control server 120 includes a policy DB 106, a resource DB 102, an ACL generation unit 103, a ACL conversion unit 101, and a distribution unit 105. The control target machines 200-1 to 200-n each include a setting unit 201 and a receiving unit 203. The function of each unit is the same as that of a corresponding portion described in each of the above embodiments, and therefore will not be described below.

In the integrated access control server 120, a to-be-distributed policy is supplied from the policy DB 106, in which policies that have been mapped out are accumulated, to the ACL generation unit 103. Therefore, an ACL is obtained.

For example, suppose that under the mapped-out policy, Yamada, who is in an accounting department, is allowed to read and write data under /var/samba/pub/, a directory shared also by a Web server, and data under /var/samba/keiri, a directory used exclusively by the accounting department, but is not allowed to read and write data in any other directories under /var/samba/. On the other hand, suppose that in the ACL generation unit 103, an access actor of Yamada of the accounting department that is written in a policy is described as Yamada. As for the access target resources, suppose that the following are written: /var/samba/pub/, /var/samba/keiri/, /var/samba/**. An access right to allow data to be written to each access target resource is represented by "write+". An access right to prohibit data from being written to each access target resource is represented by "write−". That is, permission is represented by "+", and prohibition by "−". Suppose that access control rules are described by writing access rights of writing, reading and execution. Moreover, suppose that access control rules are written in an ACL in descending order of priority just as the rules in a policy are written in descending order of priority from top. As for symbols "*" and "**" for access control lists in an ACL, suppose that "directly under a directory" is represented by "*", and "everything under a directory" by "**". More specifically, an ACL is generated as shown in FIG. 7.

Figure 8:
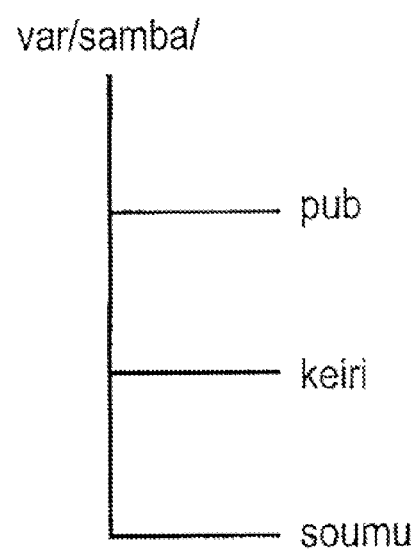
FIG. 8 is a diagram showing the configuration of an access target resource.

Then, the ACL is input into the ACL conversion unit 101. While checking the resource DB 102 in which resource information of the control target machine is accumulated, the ACL conversion unit 101 converts the ACL to an ACL that is not dependent on the order that the access control rules are written and then outputs the ACL. A conversion process at a time when all resource information of the control target machine accumulated in the resource DB 102 is the one shown in FIG. 8 for the above ACL will be described in a concrete manner with reference to FIGS. 1 and 2.

First, one line of access control rule of the ACL shown in FIG. 7 is read (Step A301 of FIG. 2).

At this time, a rule stored in the temporary storage Unit 15 by the already-existing rule judgment unit 11 does not contain the above rule (NO at step A302 of FIG. 2).

Therefore, a determination is made as to whether the above rule is a permission rule supplied to the first rule judgment unit 12 (Step A303 of FIG. 2).

The permission rules, "yamada:/var/samba/pub:read+" and "yamada:/var/samba/pub:write+," are stored in the permission rule storage unit 16 (YES at step A303 of FIG. 2, Step A305).

Meanwhile, the prohibition rule, "yamada:var/samba/pub:execute−," is supplied to the second rule judgment unit 13 (NO at step A303).

In the example here, the above rule supplied has the same access actor user as a permission rule stored in the permission rule storage unit 16 does. In addition, the access target resource of the above rule does not contain, or conflict with, an access target resource that is written in a permission rule stored in the permission rule storage unit 16. Therefore, the second rule judgment unit 13 stores the above rule in the prohibition rule storage unit 17 (NO at step A304 of FIG. 2, step A308).

Then, a determination is made as to whether the above rule is the last rule. The input ACL has not reached the last line (NO at step A309 of FIG. 2).

Accordingly, the next second line of access control rule is read (Step A301 of FIG. 2).

Even at this time, a rule stored in the temporary storage unit 15 by the already-existing rule judgment unit 11 does not contain the above rule (NO at step A302 of FIG. 2).

Therefore, a determination is made as to whether the above rule is a permission rule supplied to the first rule judgment unit 12 (Step A303 of FIG. 2).

The permission rules, "yamada/var/samba/keiri:read+" and "yamada:/var/samba/keiri:write+," are stored in the permission rule storage unit 16 (YES at step A303 of FIG. 2, Step A305).

Meanwhile, the prohibition rule, "yamada:var/samba/keiri:execute−," is supplied to the second rule judgment unit 13 (NO at step A303 of FIG. 2).

In the second rule judgment unit 13, the above rule supplied does not conflict with a permission rule stored in the permission rule storage unit 16. Therefore, the above rule is stored in the prohibition rule storage unit 17 (NO at step A304 of FIG. 2, step A308). Then, a determination is made as to whether the above rule is the last rule (Step A309 of FIG. 2). Since the input ACL has not reached the last line, the next third line of access control rule is read (Step A301 of FIG. 2).

Since a rule stored in the temporary storage unit 15 by the already-existing rule judgment unit 11 does not contain the above rule (NO at step A302 of FIG. 2), the above rule is supplied to the first rule judgment unit 12 where a determination is made as to whether the above rule is a permission rule. Since the above rule is a prohibition rule, the above rule is supplied to the second rule judgment unit 13 (NO at step A303 of FIG. 2).

In the second rule judgment unit 13, since the supplied rule, "yamada/var/samba/**:execute−," does not conflict with a permission rule stored in the permission rule storage unit 16, the supplied rule is stored in the prohibition rule storage unit 17 (NO at step A304 of FIG. 2, step A308).

Meanwhile, "yamada:/var/samba/:read−" and "yamada/var/samba/:write−" conflict with the following rules stored in the permission rule storage unit 16: "yamada:/var/samba/pub:read+," "yamada/var/samba/pub:write+," "yamada:/var/samba/keiri:read+," "yamada/var/samba/keiri:write+." Therefore, "yamada:/var/samba/:read−" and "yamada:/var/samba/:write−" are supplied to the resource expansion unit 14 (YES at step A304 of FIG. 2).

After "yamada:/var/samba/**:read−" is supplied, the resource expansion unit 14 checks the resource DB106; recognizes the existence of pub, keiri, and soumu under /var/samba/; and then carries out expansion so as to be able to show resource information of the same level as "yamada/var/samba/pub:read+" and "yamada/var/samba/keiri:read+" stored in the permission rule storage unit 16 (Step A306 of FIG. 2).

Then, the following are obtained: "yamada/var/samba/pub:read−," "yamada/var/samba/keiri:read−," "yamada/var/samba/soumu:read−," and "yamada/var/samba/*:read−." Except for the access target resources, "var/samba/pub" and "/var/samba/keiri/," stored in the permission rule storage unit 16, "yamada:/var/samba/soumu:read−" and "yamada/var/samba/*:read−" are stored in the prohibition rule storage unit 17 (Step A307 and A8 of FIG. 2).

Moreover, as for the supplied "yamada/var/samba/**:write−," a similar process takes place to store "yamada/var/samba/soumu:write−" and "yamada:/var/samba/*:write−" in the prohibition rule storage unit 17 (Steps A304, A306, A307 and A308 of FIG. 2). Since the input ACL has reached the last line (YES at step A309 of FIG. 2), the following rules stored in the prohibition rule storage unit 17 are output before an ACL is obtained in a black-list format: "yamada/var/samba/pub:execute−," "yamada/var/samba/keiri:execute−," "yamada:/var/samba/soumu:read−, write−," and "yamada:/var/samba/*:read−, write−."

In the case of the black-list, a default rule is permitted. Therefore, an ACL that has given permission as to an access right not written for the output access target resource is obtained as an output as shown in FIG. 9. The ACL, which is obtained as an output, has no restrictions on the order that access control rules are written. Therefore, even when an access control rule is arbitrarily replaced, or when the access control mechanism does not perform processes in the order that access control rules are written from top, the same access control effect can be achieved as long as all the access control rules written in the ACL are subjected to access control.

Finally, the distribution unit 105 distributes the ACL output by the ACL conversion unit 101 to the control target machine 200-n, and instructs the control target machine 200-n to set. In this case, as for a method of distributing and setting the ACL, an arbitrary communication protocol, such as telnet or ssh, may be used. However, it is desirable that a communication protocol shown in FIG. 10 be used.

The protocol of FIG. 10 will be described.

The integrated access control server 120, which distributes the ACL, uses the distribution unit 105 to make a setting preparation inquiry to the control target machine 200-n (Step B501 of FIG. 10).

Then, the integrated access control server 120 obtains information about whether the setting unit 201 of the control target machine 200-n is valid, which communication protocol the receiving unit 203 of the control target machine 200-n supports as a protocol used for transferring the to-be-distributed ACL, or which protocol is used as the present ACL transferring unit (Step B502 of FIG. 10). At this time, it is desirable that a message complies with a SOAP-based WS-Management as shown in FIG. 11. In the present example, Get Action of WS-Management is used. A resource, which as a resource URI expresses the settings of the setting unit 201, or a resource, which expresses a corresponding protocol, are specified. Then, a message is transmitted to the receiving unit 203 of the control target machine 200-n. Therefore, an inquiry is made. A corresponding setting preparation inquiry response is returned by the receiving unit 203 of the control target machine 200-n to the transmitting unit 105 of the integrated access control server 120 as GettResponse Action that complies with the SOAP-based on WS-Management.

Then, the distribution unit 105 of the integrated access control server 120 follows a protocol, which is obtained by the above process of making a setting preparation inquiry, to transfer the ACL to the receiving unit 203 of the control target machine 200-n (Step B503 of FIG. 10). The transfer protocol used here complies with the protocol obtained by the previous process of making a setting preparation inquiry, and is not limited to a specific one.

The distribution unit 105 of the integrated access control server 120 complies with the SOAP-based WS-Management as shown in FIG. 12. In the case of updating, Put Action of MS-Management is used. In the case of deletion, Delete of MS-Management is used. Thus, a resource, which as a resource URI expresses the setting unit 201, is specified. In addition, Policy-Id, which indicates a to-be-set ACL, is specified. A message is transmitted to the receiving unit 203 of the control target machine 200-n to make an ACL setting request (Step B504 of FIG. 10).

After receiving the ACL setting request, the receiving unit 203 instructs the setting unit 201 to set the above (Step B505 of FIG. 10). A setting instruction response thereof is obtained from the setting unit 201 (Step B506 of FIG. 10).

After receiving the setting instruction response, the receiving unit 203 returns PutResponse Action or DeleteResponse Action, which comply with the SOAP-based WS-Management, to the distribution unit 105 of the integrated access control server 120 as an ACL setting request response (Step B507 of FIG. 10).

If the setting unit 201 placed in the control target machine 200-$n$ is the one that processes an ACL in a black-list format, all that is requires is the ACL shown in FIG. 9 as an ACL distributed from the integrated access control server 120, which distributes an ACL. It is unnecessary to prepare ACLs corresponding to the control target machines 200-1, 200-2, . . . , and 200-$n$, respectively. Therefore, the number of ACLs that the integrated access control server 120 needs to generate from a to-be-distributed policy can be one even as the control target machines increase in number.

According to the above-described embodiments and example of the present invention, the following advantages are obtained.

The first advantage is that it is possible to reduce the cost of correcting an access control list after an access control policy is altered.

The reason is that since an access control list converted by the present invention has no restrictions on the order that access control rules are written, all that is required is to handle only the access control list, or a collection of access control rules.

The second advantage is that it is possible to bring out the same access control effect for a plurality of access control mechanisms with a single access control list.

The reason is that since the access control list that is converted by the present invention and has no restrictions on the order is able to output the same interpretation result concerning an arbitrary access control mechanism that recognizes, as an interpretation target, an access control list having the same default rule, which is a rule under which the above is going to happen unless otherwise specified by a person concerned, it becomes possible to carry out the same access control to a plurality of access control mechanisms using one access control list.

Incidentally, the integrated access control server and control target machine of the embodiments of the present invention can be realized by hardware. However, the integrated access control server and the control target machine may be also realized by a computer that reads a program, which causes the computer to function as the integrated access control server and the control target machine, from a computer-readable recording medium and executes the program.

The access control method of the embodiments of the present invention can be realized by hardware. However, the method may be also realized by a computer that reads a program, which causes the computer to perform the method, from a computer-readable recording medium and executes the program.

The above-described embodiments are preferred embodiments of the present invention. However, the scope of the present invention is not limited only to the above embodiments. The present invention may be embodied after being modified in various ways without departing from the scope of the present invention.

The present application is based on Japanese Patent Application No. 2009-066016 (filed on Mar. 18, 2009), and claims priority under the Paris Convention from Japanese Patent Application No. 2009-066016, the contents of which being incorporated herein by reference. Although the exemplary embodiments of the present invention have been described in detail, it should be understood that various changes, substitutions and alternatives may be made without departing from the spirit and scope of the appended claims. Even if the claims are amended during an application process, the inventor intends the range of equivalency of the claimed invention to be maintained.

The whole or part of the above-described embodiments can be described as, but not limited to, the following supplementary notes.

(Supplementary note 1) An access list conversion device that is connected to a resource database in which the state of a resource as an access target is recorded and updates an access control rule using an access control list, which is a collection of rules used to control access to the resource, includes: a temporary storage unit that stores in advance a "permission rule" providing that an actor, which is a target of the access control, can access the resource and a "prohibition rule" providing that the actor cannot access the resource; an already-existing rule judgment unit that reads out a rule from the access control list accepted and judges whether the readout rule is contained in the permission and prohibition rules stored in advance in the temporary storage unit; a first rule judgment unit that records the readout rule in the temporary storage unit when the judgment result shows that the readout rule is not contained and when the readout rule is a permission rule; a second rule judgment unit that makes, when the judgment result shows that the readout rule is not contained and when the readout rule is a prohibition rule, a determination as to whether the prohibition rule conflicts with the permission rule stored in the temporary storage unit, and stores, when the prohibition rule does not conflict, the prohibition rule in the temporary storage unit; and a resource expansion unit that converts, when the result of judgment by the second rule judgment unit shows that the prohibition rule conflicts, the prohibition rule to a prohibition rule by removing access target resources written in the permission rule from access target resources written in the prohibition rule on the basis of resource information of the resource database and stores the prohibition rule in the temporary storage unit.

(Supplementary note 2) An access list conversion device that is connected to a resource database in which the state of a resource as an access target is recorded and updates an access control rule using an access control list, which is a collection of rules used to control access to the resource, includes: a temporary storage unit that stores in advance a "permission rule" providing that an actor, which is a target of the access control, can access the resource and a "prohibition rule" providing that the actor cannot access the resource; an already-existing rule judgment unit that reads out a rule from the access control list accepted and judges whether the readout rule is contained in the permission and prohibition rules stored in advance in the temporary storage unit; a first rule judgment unit that records the readout rule in the temporary storage unit when the judgment result shows that the readout rule is not contained and when the readout rule is a prohibition rule; a second rule judgment unit that makes, when the judgment result shows that the readout rule is not contained and when the readout rule is a permission rule, a determination as to whether the permission rule conflicts with the prohibition rule stored in the temporary storage unit, and stores, when the permission rule does not conflict, the permission rule in the temporary storage unit; and a resource expansion unit that converts, when the result of judgment by the second rule judgment unit shows that the permission rule conflicts, the permission rule to a permission rule by removing access target resources written in the prohibition rule from access target resources written in the permission rule on the basis of resource information of the resource database and stores the permission rule in the temporary storage unit.

(Supplementary note 3) In the access list conversion device, according to supplementary note 1 or 2, the resource expansion unit checks entire resource information of access target resources written in a containing-side access control rule; expands access target resources written in a contained-side access control rule into a group or element that can be expressed; and carries out the conversion by removing access target resources overlapping with the access target resources written in the contained-side access control rule from the one expanded from the access target resources written in the containing-side access control rule and then writing the resultant access target resources to the access target resources of the containing-side access control rule.

(Supplementary note 4) An integrated access control server of an access control list distribution system having the integrated access control server and a control target machine connected to the integrated access control server includes: the access control list conversion device disclosed in any one of supplementary notes 1 to 3; an access control list database in which an access control list is stored; a difference extraction unit that extracts a difference between an access control list converted by the access control list conversion device and an access control list stored in the access control list database; and a distribution unit that distributes the extracted difference to the control target machine.

(Supplementary note 5) An access list conversion method that updates an access control rule using an access control list, which is a collection of rules used to control access to a resource, in an access control list conversion device connected to a resource database in which the state of the resource as an access target is recorded includes: a step of preparing a temporary storage device that stores in advance a "permission rule" providing that an actor, which is a target of the access control, can access the resource and a "prohibition rule" providing that the actor cannot access the resource; an already-existing rule judgment step of reading out a rule from the access control list accepted and judging whether the readout rule is contained in the permission and prohibition rules stored in advance in the temporary storage device; a first rule judgment step of recording the readout rule in the temporary storage device when the judgment result shows that the readout rule is not contained and when the readout rule is a permission rule; a second rule judgment step of making, when the judgment result shows that the readout rule is not contained and when the readout rule is a prohibition rule, a determination as to whether the prohibition rule conflicts with the permission rule stored in the temporary storage unit, and storing, when the prohibition rule does not conflict, the prohibition rule in the temporary storage unit; and a resource expansion step of converting, when the result of judgment by the second rule judgment step shows that the prohibition rule conflicts, the prohibition rule to a prohibition rule by removing access target resources written in the permission rule from access target resources written in the prohibition rule on the basis of resource information of the resource database and storing the prohibition rule in the temporary storage device.

(Supplementary note 6) An access list conversion method that updates an access control rule using an access control list, which is a collection of rules used to control access to a resource, in an access control list conversion device connected to a resource database in which the state of the resource as an access target is recorded includes: a step of preparing a temporary storage device that stores in advance a "permission rule" providing that an actor, which is a target of the access control, can access the resource and a "prohibition rule" providing that the actor cannot access the resource; an already-existing rule judgment step of reading out a rule from the access control list accepted and judging whether the readout rule is contained in the permission and prohibition rules stored in advance in the temporary storage device; a first rule judgment step of recording the readout rule in the temporary storage device when the judgment result shows that the readout rule is not contained and when the readout rule is a prohibition rule; a second rule judgment step of making, when the judgment result shows that the readout rule is not contained and when the readout rule is a permission rule, a determination as to whether the permission rule conflicts with the prohibition rule stored in the temporary storage unit, and storing, when the permission rule does not conflict, the permission rule in the temporary storage unit; and a resource expansion step of converting, when the result of judgment by the second rule judgment step shows that the permission rule conflicts, the permission rule to a permission rule by removing access target resources written in the prohibition rule from access target resources written in the permission rule on the basis of resource information of the resource database and storing the permission rule in the temporary storage device.

(Supplementary note 7) In the access list conversion method, according to supplementary note 5 or 6, in the resource expansion step, entire resource information of access target resources written in a containing-side access control rule is checked; access target resources written in a contained-side access control rule into a group or element that can be expressed are expanded; and conversion is carried out by removing access target resources overlapping with the access target resources written in the contained-side access control rule from the one expanded from the access target resources written in the containing-side access control rule and then writing the resultant access target resources to the access target resources of the containing-side access control rule.

(Supplementary note 8) The access control list conversion method according to any one of supplementary notes 5 to 7 includes: a step of preparing an access control list database in which an access control list is stored; a difference extraction step of extracting a difference between the converted access control list and an access control list stored in the access control list database; and a distribution step of distributing the extracted difference to a control target machine.

(Supplementary note 9) An access list conversion program, installed in an access list conversion device that is connected to a resource database in which the state of a resource as an access target is recorded and updates an access control rule using an access control list which is a collection of rules used to control access to the resource, causes a computer to function as the access list conversion device including: a temporary storage unit that stores in advance a "permission rule" providing that an actor, which is a target of the access control, can access the resource and a "prohibition rule" providing that the actor cannot access the resource; an already-existing rule judgment unit that reads out a rule from the access control list accepted and judges whether the readout rule is contained in the permission and prohibition rules stored in advance in the temporary storage unit; a first rule judgment unit that records the readout rule in the temporary storage unit when the judgment result shows that the readout rule is not contained and when the readout rule is a permission rule; a second rule judgment unit that makes, when the judgment result shows that the readout rule is not contained and when the readout rule is a prohibition rule, a determination as to whether the prohibition rule conflicts with the permission rule stored in the temporary storage unit, and stores, when the prohibition rule does not conflict, the prohibition rule in the temporary storage unit; and a resource expansion unit that converts, when the result of judgment by the second rule judgment unit shows that the prohibition rule conflicts, the prohibition rule to a prohibition rule by removing access target resources written in the permission rule from access target resources written in the prohibition rule on the basis of resource information of the resource database and stores the prohibition rule in the temporary storage unit.

(Supplementary note 10) An access list conversion program, installed in an access list conversion device that is connected to a resource database in which the state of a resource as an access target is recorded and updates an access control rule using an access control list which is a collection of rules used to control access to the resource, causes a computer to function as the access list conversion device including: a temporary storage unit that stores in advance a "permission rule" providing that an actor, which is a target of the access control, can access the resource and a "prohibition rule" providing that the actor cannot access the resource; an already-existing rule judgment unit that reads out a rule from the access control list accepted and judges whether the readout rule is contained in the permission and prohibition rules stored in advance in the temporary storage unit; a first rule judgment unit that records the readout rule in the temporary storage unit when the judgment result shows that the readout rule is not contained and when the readout rule is a prohibition rule; a second rule judgment unit that makes, when the judgment result shows that the readout rule is not contained and when the readout rule is a permission rule, a determination as to whether the permission rule conflicts with the prohibition rule stored in the temporary storage unit, and stores, when the permission rule does not conflict, the permission rule in the temporary storage unit; and a resource expansion unit that converts, when the result of judgment by the second rule judgment unit shows that the permission rule conflicts, the permission rule to a permission rule by removing access target resources written in the prohibition rule from access target resources written in the permission rule on the basis of resource information of the resource database and stores the permission rule in the temporary storage unit.

(Supplementary note 11) In the access list conversion program, or access control list conversion program, according to supplementary notes 9 or 10, the resource expansion unit checks entire resource information of access target resources written in a containing-side access control rule; expands access target resources written in a contained-side access control rule into a group or element that can be expressed; and carries out the conversion by removing access target resources overlapping with the access target resources written in the contained-side access control rule from the one expanded from the access target resources written in the containing-side access control rule and then writing the resultant access target resources to the access target resources of the containing-side access control rule.

(Supplementary note 12) In the access control list conversion program according to any one of supplementary notes 9 to 11, the access list conversion device further includes: an access control list database in which an access control list is stored; a difference extraction unit that extracts a difference between the converted access control list and an access control list stored in the access control list database; and a distribution unit that distributes the extracted difference to a control target machine.

INDUSTRIAL APPLICABILITY

The present invention is suitable for the case where the intention of a person who alters a policy is to be confirmed at a time when the policy, expressed as an access control list, is altered, or the case where difference distribution should take place with the consistency of an altered portion assured.

The present invention is also suitable for the case where a new access control list is created or the case where an access control list is altered for the first time because an access control list is created for a plurality of access control execution mechanisms or because an altered portion of an access control list is reflected in a plurality of access control execution mechanisms.

REFERENCE SIGNS LIST

11: Already-existing rule judgment unit
12: First rule judgment unit
13: Second rule judgment unit
14: Resource expansion unit
15: Temporary storage unit
16: Permission rule storage unit
17: Prohibition rule storage unit
100, 110, 120: Integrated access control server
101: ACL conversion unit
102: Resource DB
103: ACL generation unit
104: Difference extraction unit
105: Distribution unit
106: Policy DB
107: ACLDB
108: Signature unit
200, 210: Control target machine
201: Setting unit
202: Merging unit
203: Receiving unit
204: Signature verifying unit

The invention claimed is:
1. An access list conversion device that is connected to a resource database in which the state of a resource as an access target is recorded and updates an access control rule using an access control list, which is a collection of rules used to control access to the resource, the device comprising:
a temporary storage hardware-implemented unit that stores in advance a "permission rule" providing that an actor, which is a target of the access control, can access the resource and a "prohibition rule" providing that the actor cannot access the resource;
an already-existing rule judgment hardware-implemented unit that reads out a rule from the access control list accepted and judges whether the readout rule is contained in the permission and prohibition rules stored in advance in the temporary storage hardware-implemented unit;
a first rule judgment hardware-implemented unit that records the readout rule in the temporary storage hardware-implemented unit when a judgment result shows that the readout rule is not contained and when the readout rule is a permission rule;
a second rule judgment hardware-implemented unit that makes, when a judgment result shows that the readout rule is not contained and when the readout rule is a prohibition rule, a determination as to whether the prohibition rule conflicts with the permission rule stored in the temporary storage hardware-implemented unit, and stores, when the prohibition rule does not conflict, the prohibition rule in the temporary storage hardware-implemented unit; and a resource expansion hardware-implemented unit that converts, when the result of judgment by the second rule judgment hardware-implemented unit shows that the prohibition rule conflicts, the prohibition rule to a prohibition rule by removing access target resources written in the permission rule from access target resources written in the prohibition rule on the basis of resource information of the resource database and stores the prohibition rule in the temporary storage hardware-implemented unit.

2. The access list conversion device according to claim 1, wherein the resource expansion hardware-implemented unit checks entire resource information of access target resources written in a containing-side access control rule; expands access target resources written in a contained-side access control rule into a group or element that can be expressed; and carries out the conversion by removing access target resources overlapping with the access target resources written in the contained-side access control rule from the one expanded from the access target resources written in the containing-side access control rule and then writing the resultant access target resources to the access target resources of the containing-side access control rule.

3. An integrated access control server of an access control list distribution system having the integrated access control server and a control target machine connected to the integrated access control server, the server comprising:

the access list conversion device claimed in claim 1;
an access control list database in which an access control list is stored;
a difference extraction hardware-implemented unit that extracts a difference between an access control list converted by the access list conversion device and an access control list stored in the access control list database; and
a distribution hardware-implemented unit that distributes the extracted difference to the control target machine.

4. An access list conversion device that is connected to a resource database in which the state of a resource as an access target is recorded and updates an access control rule using an access control list, which is a collection of rules used to control access to the resource, the device comprising:

a temporary storage hardware-implemented unit that stores in advance a "permission rule" providing that an actor, which is a target of the access control, can access the resource and a "prohibition rule" providing that the actor cannot access the resource;
an already-existing rule judgment hardware-implemented unit that reads out a rule from the access control list accepted and judges whether the readout rule is contained in the permission and prohibition rules stored in advance in the temporary storage hardware-implemented unit;
a first rule judgment hardware-implemented unit that records the readout rule in the temporary storage hardware-implemented unit when a judgment result shows that the readout rule is not contained and when the readout rule is a prohibition rule;
a second rule judgment hardware-implemented unit that makes, when a judgment result shows that the readout rule is not contained and when the readout rule is a permission rule, a determination as to whether the permission rule conflicts with the prohibition rule stored in the temporary storage hardware-implemented unit, and stores, when the permission rule does not conflict, the permission rule in the temporary storage hardware-implemented unit; and a resource expansion hardware-implemented unit that converts, when the result of judgment by the second rule judgment hardware-implemented unit shows that the permission rule conflicts, the permission rule to a permission rule by removing access target resources written in the prohibition rule from access target resources written in the permission rule on the basis of resource information of the resource database and stores the permission rule in the temporary storage hardware-implemented unit.

5. The access list conversion device according to claim 4, wherein the resource expansion hardware-implemented unit checks entire resource information of access target resources written in a containing-side access control rule; expands access target resources written in a contained-side access control rule into a group or element that can be expressed; and carries out the conversion by removing access target resources overlapping with the access target resources written in the contained-side access control rule from the one expanded from the access target resources written in the containing-side access control rule and then writing the resultant access target resources to the access target resources of the containing-side access control rule.

6. An integrated access control server of an access control list distribution system having the integrated access control server and a control target machine connected to the integrated access control server, the server comprising:

the access list conversion device claimed in claim 4;
an access control list database in which an access control list is stored;
a difference extraction hardware-implemented unit that extracts a difference between an access control list converted by the access list conversion device and an access control list stored in the access control list database; and
a distribution hardware-implemented unit that distributes the extracted difference to the control target machine.

7. An access list conversion method that updates an access control rule using an access control list, which is a collection of rules used to control access to a resource, in an access control list conversion device connected to a resource database in which the state of the resource as an access target is recorded, the method comprising:

a step of preparing a temporary storage device that stores in advance a "permission rule" providing that an actor, which is a target of the access control, can access the resource and a "prohibition rule" providing that the actor cannot access the resource;
an already-existing rule judgment step of reading out a rule from the access control list accepted and judging whether the readout rule is contained in the permission and prohibition rules stored in advance in the temporary storage device;
a first rule judgment step of recording the readout rule in the temporary storage device when a judgment result shows that the readout rule is not contained and when the readout rule is a permission rule;
a second rule judgment step of making, when a judgment result shows that the readout rule is not contained and when the readout rule is a prohibition rule, a determination as to whether the prohibition rule conflicts with the permission rule stored in the temporary storage unit, and storing, when the prohibition rule does not conflict, the prohibition rule in the temporary storage unit; and a resource expansion step of converting, when the result of judgment by the second rule judgment step shows that the prohibition rule conflicts, the prohibition rule to a prohibition rule by removing access target resources written in the permission rule from access target resources written in the prohibition rule on the basis of resource information of the resource database and storing the prohibition rule in the temporary storage device.

8. The access list conversion method according to claim 7, wherein in the resource expansion step, entire resource information of access target resources written in a containing-side access control rule is checked; access target resources written in a contained-side access control rule into a group or element that can be expressed are expanded; and conversion is carried out by removing access target resources overlapping with the access target resources written in the contained-side access control rule from the one expanded from the access target resources written in the containing-side access control rule and then writing the resultant access target resources to the access target resources of the containing-side access control rule.

9. The access control list conversion method according to claim 7, comprising:

a step of preparing an access control list database in which an access control list is stored;

a difference extraction step of extracting a difference between the converted access control list and an access control list stored in the access control list database; and a distribution step of distributing the extracted difference to a control target machine.

10. An access list conversion method that updates an access control rule using an access control list, which is a collection of rules used to control access to a resource, in an access control list conversion device connected to a resource database in which the state of the resource as an access target is recorded, the method comprising:

a step of preparing a temporary storage device that stores in advance a "permission rule" providing that an actor, which is a target of the access control, can access the resource and a "prohibition rule" providing that the actor cannot access the resource;

an already-existing rule judgment step of reading out a rule from the access control list accepted and judging whether the readout rule is contained in the permission and prohibition rules stored in advance in the temporary storage device;

a first rule judgment step of recording the readout rule in the temporary storage device when a judgment result shows that the readout rule is not contained and when the readout rule is a prohibition rule;

a second rule judgment step of making, when a judgment result shows that the readout rule is not contained and when the readout rule is a permission rule, a determination as to whether the permission rule conflicts with the prohibition rule stored in the temporary storage unit, and storing, when the permission rule does not conflict, the permission rule in the temporary storage unit; and a resource expansion step of converting, when the result of judgment by the second rule judgment step shows that the permission rule conflicts, the permission rule to a permission rule by removing access target resources written in the prohibition rule from access target resources written in the permission rule on the basis of resource information of the resource database and storing the permission rule in the temporary storage device.

11. The access list conversion method according to claim 10, wherein in the resource expansion step, entire resource information of access target resources written in a containing-side access control rule is checked; access target resources written in a contained-side access control rule into a group or element that can be expressed are expanded; and conversion is carried out by removing access target resources overlapping with the access target resources written in the contained-side access control rule from the one expanded from the access target resources written in the containing-side access control rule and then writing the resultant access target resources to the access target resources of the containing-side access control rule.

12. The access list conversion method according to claim 10, comprising:

a step of preparing an access control list database in which an access control list is stored;

a difference extraction step of extracting a difference between the converted access control list and an access control list stored in the access control list database; and a distribution step of distributing the extracted difference to a control target machine.

13. A non-transitory computer-readable recording medium storing an access list conversion program that causes a computer functioning as access list conversion device that is connected to a resource database in which the state of a resource as an access target is recorded and updates an access control rule using an access control list which is a collection of rules used to control access to the resource, causing the computer to function as the access list conversion device comprising:

a temporary storage unit that stores in advance a "permission rule" providing that an actor, which is a target of the access control, can access the resource and a "prohibition rule" providing that the actor cannot access the resource;

an already-existing rule judgment unit that reads out a rule from the access control list accepted and judges whether the readout rule is contained in the permission and prohibition rules stored in advance in the temporary storage unit;

a first rule judgment unit that records the readout rule in the temporary storage unit when a judgment result shows that the readout rule is not contained and when the readout rule is a permission rule;

a second rule judgment unit that makes, when a judgment result shows that the readout rule is not contained and when the readout rule is a prohibition rule, a determination as to whether the prohibition rule conflicts with the permission rule stored in the temporary storage unit, and stores, when the prohibition rule does not conflict, the prohibition rule in the temporary storage unit; and a resource expansion unit that converts, when the result of judgment by the second rule judgment unit shows that the prohibition rule conflicts, the prohibition rule to a prohibition rule by removing access target resources written in the permission rule from access target resources written in the prohibition rule on the basis of resource information of the resource database and stores the prohibition rule in the temporary storage unit.

14. The non-transitory computer-readable recording medium according to claim 13, wherein the resource expansion unit checks entire resource information of access target resources written in a containing-side access control rule; expands access target resources written in a contained-side access control rule into a group or element that can be expressed; and carries out the conversion by removing access target resources overlapping with the access target resources written in the contained-side access control rule from the one expanded from the access target resources written in the containing-side access control rule and then writing the resultant access target resources to the access target resources of the containing-side access control rule.

15. The non-transitory computer-readable recording medium according to claim 13, wherein
the access list conversion device further includes:
an access control list database in which an access control list is stored;
a difference extraction unit that extracts a difference between the converted access control list and an access control list stored in the access control list database; and
a distribution unit that distributes the extracted difference to a control target machine.

16. A non-transitory computer-readable recording medium storing an access list conversion program that causes a computer functioning as access list conversion device that is connected to a resource database in which the state of a resource as an access target is recorded and updates an access control rule using an access control list which is a collection of rules used to control access to the resource, causing the computer to function as the access list conversion device comprising:
a temporary storage unit that stores in advance a "permission rule" providing that an actor, which is a target of the access control, can access the resource and a "prohibition rule" providing that the actor cannot access the resource;
an already-existing rule judgment unit that reads out a rule from the access control list accepted and judges whether the readout rule is contained in the permission and prohibition rules stored in advance in the temporary storage unit;
a first rule judgment unit that records the readout rule in the temporary storage unit when a judgment result shows that the readout rule is not contained and when the readout rule is a prohibition rule;
a second rule judgment unit that makes, when a judgment result shows that the readout rule is not contained and when the readout rule is a permission rule, a determination as to whether the permission rule conflicts with the prohibition rule stored in the temporary storage unit, and stores, when the permission rule does not conflict, the permission rule in the temporary storage unit; and
a resource expansion unit that converts, when the result of judgment by the second rule judgment unit shows that the permission rule conflicts, the permission rule to a permission rule by removing access target resources written in the prohibition rule from access target resources written in the permission rule on the basis of resource information of the resource database and stores the permission rule in the temporary storage unit.

17. The non-transitory computer-readable recording medium according to claim 16, wherein
the resource expansion unit checks entire resource information of access target resources written in a containing-side access control rule; expands access target resources written in a contained-side access control rule into a group or element that can be expressed; and carries out the conversion by removing access target resources overlapping with the access target resources written in the contained-side access control rule from the one expanded from the access target resources written in the containing-side access control rule and then writing the resultant access target resources to the access target resources of the containing-side access control rule.

18. The non-transitory computer-readable recording medium according to claim 16, wherein
the access list conversion device further includes:
an access control list database in which an access control list is stored;
a difference extraction unit that extracts a difference between the converted access control list and an access control list stored in the access control list database; and
a distribution unit that distributes the extracted difference to a control target machine.

* * * * *